United States Patent
Gross et al.

(10) Patent No.: US 6,757,608 B2
(45) Date of Patent: Jun. 29, 2004

(54) METHOD AND DEVICE FOR CONTROLLING OPERATIONAL SEQUENCES

(75) Inventors: Helmut Gross, Kornwestheim (DE); Bernhard Mencher, Schwieberdingen (DE); Peter Baeuerle, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 09/966,198

(22) Filed: Sep. 28, 2001

(65) Prior Publication Data

US 2002/0103592 A1 Aug. 1, 2002

(30) Foreign Application Priority Data

Sep. 29, 2000 (DE) .......................................... 100 48 808

(51) Int. Cl.[7] .............................................. G06F 19/00
(52) U.S. Cl. ........................... 701/115; 700/27; 700/25; 123/364; 123/478
(58) Field of Search ............................... 701/115, 102, 701/110, 101; 700/15, 14, 17, 18, 210, 211; 123/361, 478, 479

(56) References Cited

U.S. PATENT DOCUMENTS 4,566,410 A * 1/1986 Demizu .................. 123/179.6
4,932,382 A * 6/1990 Fujimoto et al. ............ 123/488
5,999,875 A * 12/1999 Bruedigam et al. ......... 701/110
6,148,795 A * 11/2000 Gerhardt et al. ............ 123/436
6,386,157 B1 * 5/2002 Hartke et al. ............ 123/90.15

OTHER PUBLICATIONS

Heintz et al., *Einsatzmöglichkeiten und Zukunftschancen intelligenter Sensoren im Kraftfahrzeug* [*Use Possibilities and Future Chances of Intelligent Sensors in the Motor Vehicle*], BOSCH Technical Reports 1990, Issue 52, pp. 30–41.*

* cited by examiner

*Primary Examiner*—Willis R. Wolfe
*Assistant Examiner*—Johnny H. Hoang
(74) *Attorney, Agent, or Firm*—Kenyon & Kenyon

(57) ABSTRACT

A method and a device for controlling operational sequences, particularly in a vehicle, at least one sensor having a connection unit being connected via a bus system to at least one control unit for controlling the operational sequences, the control unit likewise having a connection unit, and sensor information being transmitted to the control unit. The control unit reads in and/or processes the sensor information at specifiable synchronization points. A trigger signal is transmitted by the control unit via the bus system to the sensor in such a way with an allowance that the sensor information is available in a manner that it is able to be read in and/or processed exactly at the synchronization point for the control unit.

20 Claims, 6 Drawing Sheets

Fig. 6a
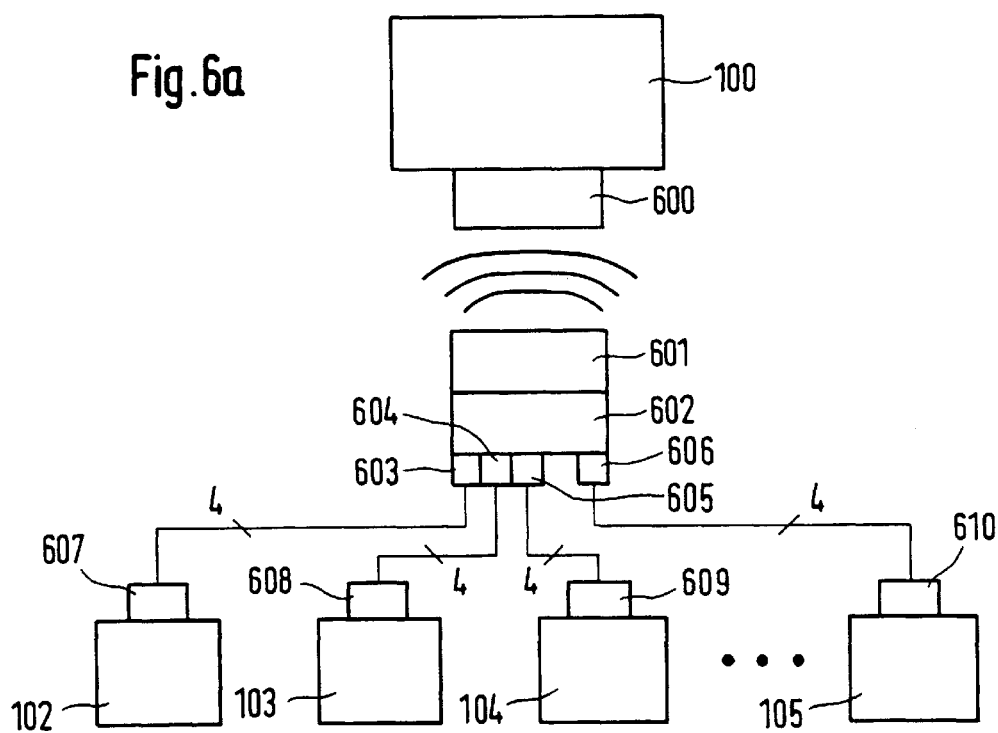
Fig. 6b
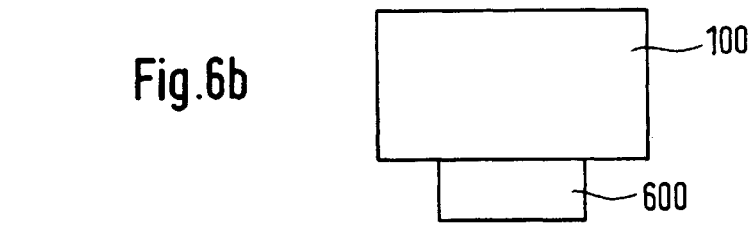
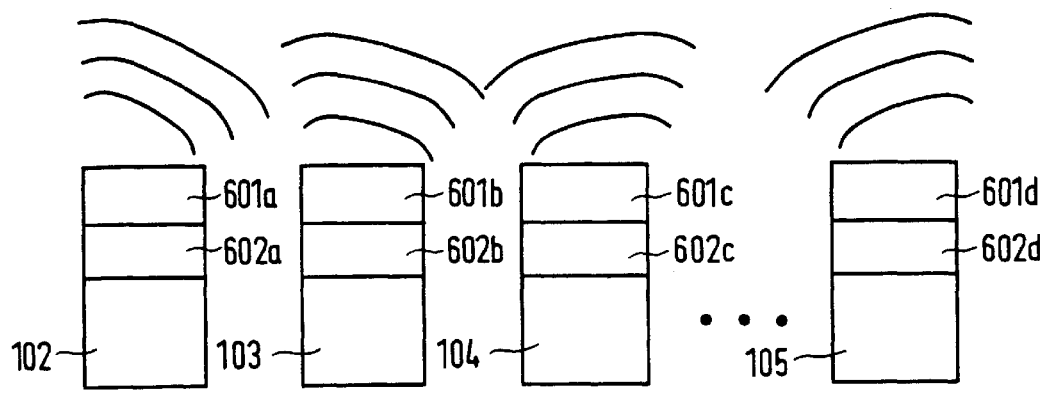

METHOD AND DEVICE FOR CONTROLLING OPERATIONAL SEQUENCES

FIELD OF THE INVENTION

The present invention relates to a method and a device for controlling operational sequences, particularly in a vehicle, at least one sensor being connected to at least one control unit for controlling the operational sequences, and sensor information being transmitted to the control unit.

BACKGROUND INFORMATION

Today, vehicle sensors, particularly the sensors in the exhaust-gas branch such as lambda sensors and hot-film air-mass meters, are generally connected in a conventional manner via a cable harness to a control unit, particularly the engine control unit. Appropriate hardware lines are available for the signals and voltage supplies.

However, smart sensor technology having bus capability is discussed in the article by Heintz and Zabler "Einsatzm öglichkeiten und Zukunftschancen intelligenter Sensoren im Kraftfahrzeug" ("Use Possibilities and Future Chances of Intelligent Sensors in the Motor Vehicle") from the BOSCH Technical Reports 1990, issue 52, pp. 30 through 41, which corresponds to the German version of the lecture at the SAE Conference in Detroit in March 1989. In the vehicle concepts in that context, multiple measurements of quantities are carried out, which are needed by electronic systems in the motor vehicle. By adding electronic components, the corresponding sensors are provided with signal preprocessing and given bus capability, i.e. are made multiply utilizable. A bus concept thereby results in which intelligent sensors having electronics locally are connected to at least one control unit.

In order to couple sensors to a control unit with the aid of a bus system, particularly a CAN bus system, diverse time conditions are observed, particularly in the case of real-time-critical applications, for example, for sensors of the exhaust branch in connection with the engine control unit. Such an optimal or optimized synchronization of the sensor suite with the control device, i.e. the control unit, is the subject matter of the present invention.

SUMMARY OF THE INVENTION

The present invention is based on a method for controlling operational sequences, particularly in a vehicle, at least one sensor having a connection unit being connected via a bus system to at least one control unit for controlling the operational sequences, the control unit likewise having a connection unit, and sensor information being transmitted to the control unit, the control unit reading in and/or processing the sensor information at specifiable synchronization points, the control unit advantageously transmitting a trigger signal via the bus system to the sensor in such a way with an allowance that the sensor information is available at the synchronization point for the control unit in a manner that it is able to be read in and/or processed. Consequently, as a basic prerequisite for the description of a sensor bus, particularly for the exhaust branch, the sensors and control unit are expediently synchronized such that the sensor information is transmitted to the control unit, i.e. is present at the control unit, just when the control unit should also read in and/or process the control information. By using a trigger signal via the bus system, the cabling expenditure, reduced by the sensor connection, can be reduced even further, since it is advantageously possible to dispense with an additional hardware trigger line, bringing with it great potential for cost savings.

If the sensor expediently contains a processing unit which preprocesses the sensor information, the allowance is advantageously predefined and/or adapted according to the time for preprocessing the sensor information.

The allowance, according to the present invention, of the trigger signal with respect to the synchronization point can advantageously ensure high topicality of the sensor information.

In one advantageous refinement, the allowance can be predefined and/or adapted in a variable manner, as a function of at least one performance quantity stemming from at least one operational sequence, in particular as a function of the engine speed. Thus, the dynamic influence of specific performance quantities assignable to operational sequences, particularly the engine speed, is advantageously taken into consideration.

The allowance is advantageously predefined and/or adapted as a function of at least one of the following influences:

a transmission time of the trigger signal from the processing unit of the control unit to its connection unit with the bus system;

a transmission time or waiting time up to the termination of a bus message already transmitted via the bus system, until the trigger signal or the sensor information can be transmitted;

a transmission time of the trigger signal itself via the bus system;

a transmission time of the trigger signal from the connection unit of the sensor to the processing unit of the sensor;

a processing time until the processing unit in the sensor has finished processing the sensor information and/or a transmission time of the sensor information from the sensor to the control unit, which includes the transmission time from the processing unit to the connection unit of the sensor and the transmission time from the connection unit of the sensor via the bus system to the connection unit of the control unit, as well as the transmission time from the connection unit of the control unit to the processing unit of the control unit.

The allowance is advantageously determined in the form of a time quantity as a time allowance, or in one advantageous refinement in the form of an angle quantity as an angle allowance. In this context, a time allowance and an angle allowance, respectively, can be converted into one another. This conversion of the time allowance into an angle allowance, taking into account the angular velocity, has the advantage that the performance quantity, particularly the engine speed, is calculated only at the synchronization point, since the instantaneous angle, especially the crankshaft angle, is available, for example, at an engine control unit, and therefore the trigger signal can be transmitted as a function of this angle information. Due to the restriction of the calculation of the performance quantity, particularly the engine speed, to the synchronization points which is thereby possible, considerable computing power and computing time can be saved in the control unit.

To ensure the topicality of the software trigger signal, a high priority, particularly the highest priority within the framework of transmission via the bus system is assigned to the software trigger signal. The sensor information is also advantageously transmitted with high priority.

In one advantageous refinement, the sensor information and the trigger signal are transmitted in a line-less manner between the connection unit of the at least one sensor and the connection unit of the control unit; in this advantageous embodiment, the connection units are designed as transmitter/receiver units of a line-less bus system, particularly a radio bus system. This advantageously permits even greater savings on line links.

BRIEF DESCRIPTION OF THE DRAWINGS

FIG. 6a shows one embodiment of the arrangement according to the present invention when working with line-less signal or information transmission between control unit and sensor.

FIG. 6b shows another embodiment of the arrangement according to the present invention when working with line-less signal or information transmission between control unit and sensor.

DETAILED DESCRIPTION

Figure 1:
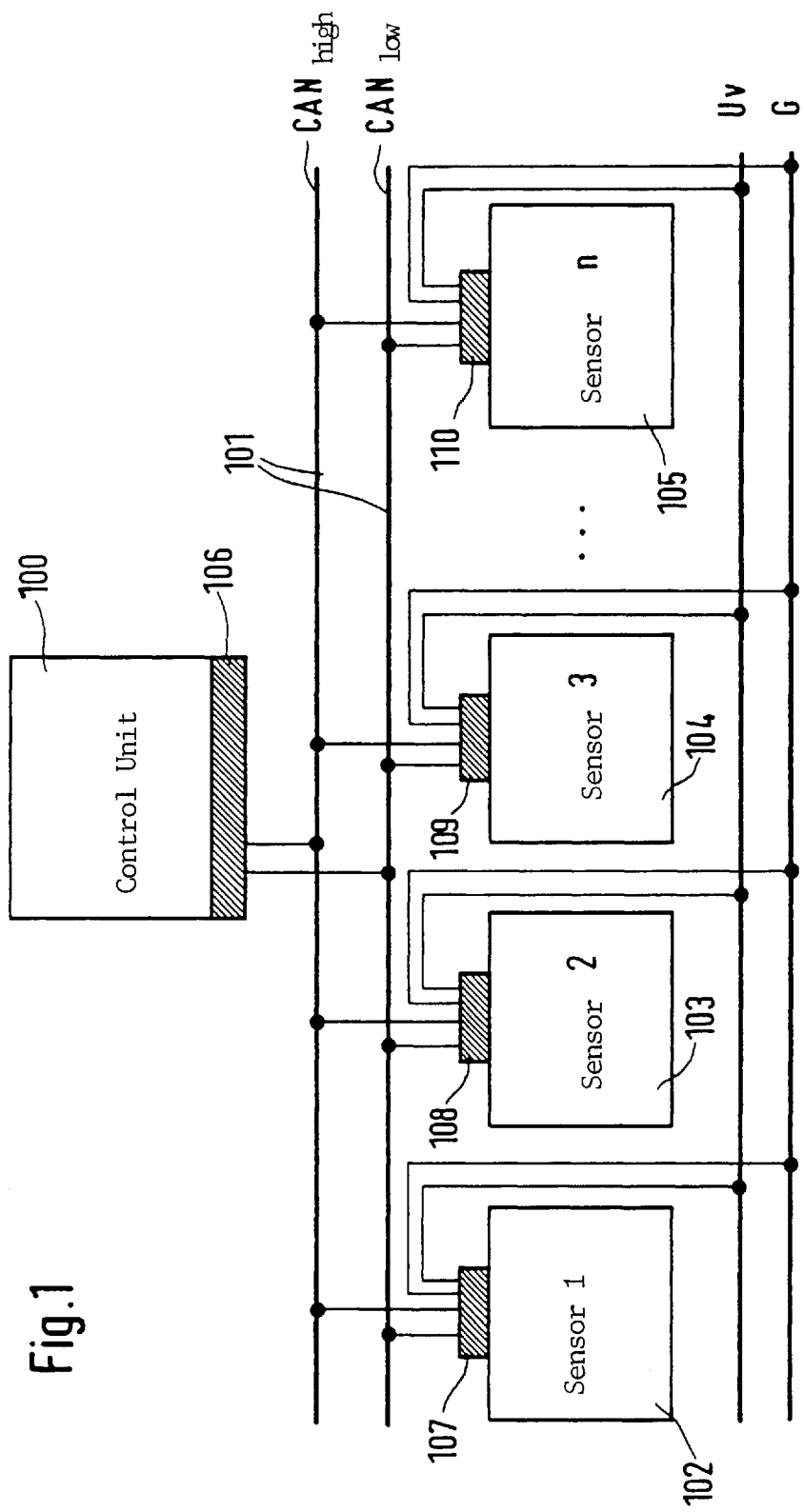
FIG. 1 shows a sensor bus system having sensors 1 through n, and a control device or a control unit which are connected by a line-conducted bus system.

FIG. 1 shows a sensor bus arrangement having a control unit 100, particularly an engine control unit, and a bus system 101, particularly a CAN bus. The two lines shown within the framework of bus system 101 are used to represent the high information and low information, respectively, within the context of a digital data transmission. The control unit is connected to bus system 101 via connection unit 106. In the same way, sensors 102 through 105 are connected to bus system 101 with the aid of connection units 107 through 110, respectively. Sensor 1 is, for example, a first lambda sensor, and sensor 2 is a second lambda sensor within the framework of a cylinder-selective lambda control; the lambda values for each segment are evaluated separately specific to the crankshaft angle, and are to be routed to the engine management within the next segment at the latest.

For example, sensor 3 is a hot-film air-mass meter HFM whose load signal is available in time at the engine control unit in a manner that it is able to be read in and/or processed at the synchronization point, thus a specifiable point of time or crankshaft angle, at which the calculation of ignition and/or injection is started for each power cycle, in order to in fact be able to determine ignition and/or the injection for each cylinder.

A further sensor mechanism is shown by way of example with sensor n, 105, which, for instance, represents an NOx sensor mechanism.

Sensor suite 102 through 105 is furthermore connected to supply voltage Uv and to ground G. The requests with respect to the transmission of the HFM signal and the segment information for the cylinder-selective lambda control are to be routed by way of the software trigger signal from the engine control unit to the respective sensors. In this context, segment represents the angle or the time duration between two synchronization points. One segment within the framework of the crankshaft angle is computed from 720° divided by the cylinder number.

The cylinder-selective lambda control and the ascertainment of the load signal with the aid of the hot-film air-mass meter over one segment are implemented, for example, in the engine management. In order, in so doing, to avoid a critical capacity utilization of bus system 101, particularly a CAN bus, the sensor information can already be pre-evaluated or preprocessed locally, thus, in a processing unit in the sensor. This preprocessing, e.g. mean-value generation, and the associated transmission of the sensor information, particularly the average value, are then carried out in time so that, for example, the injection and/or the ignition for the next power cycle can be calculated at the synchronization point.

Figure 2:
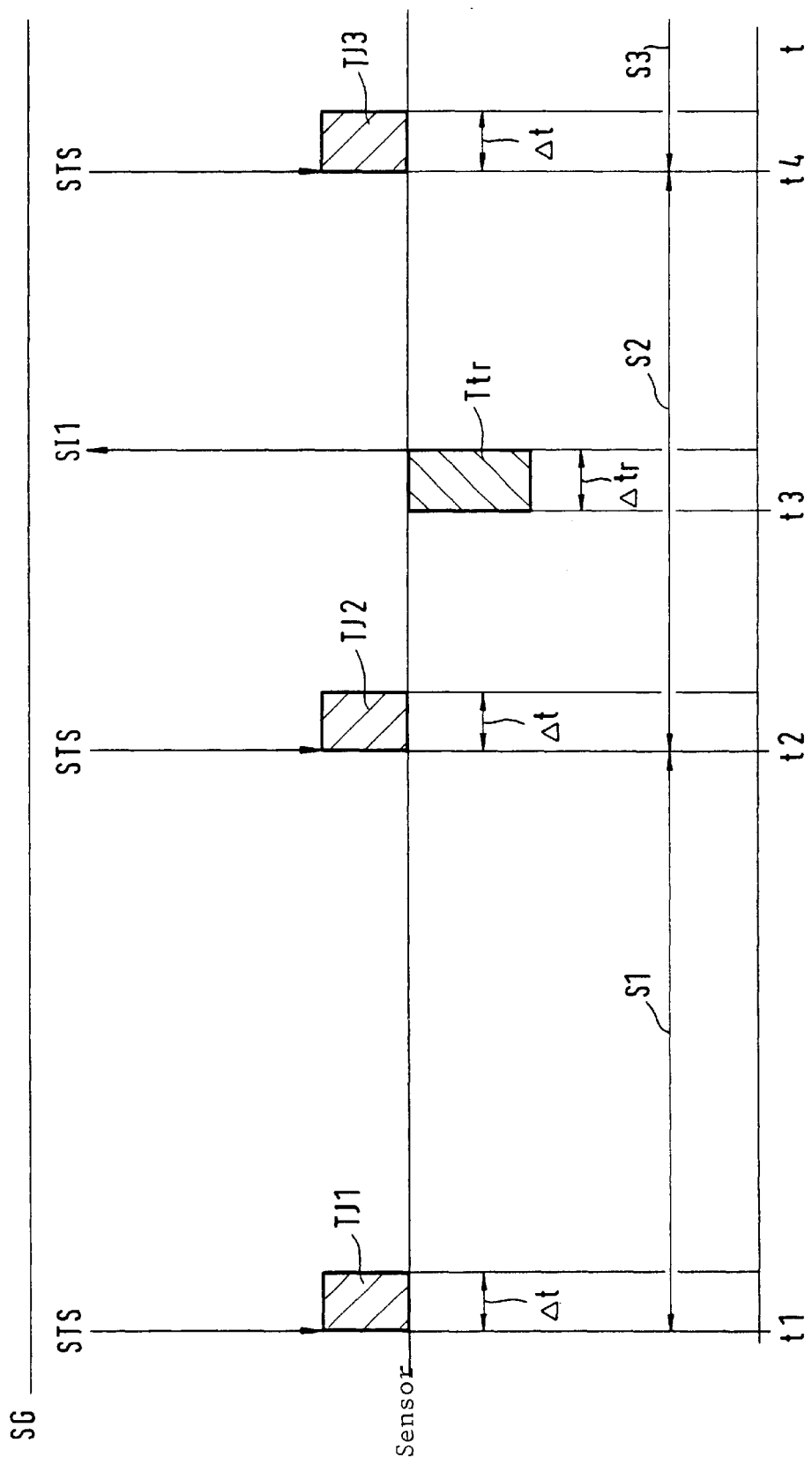
FIG. 2, in a timing diagram, shows the information exchange between control unit and sensor, particularly a lambda sensor suite, with time tolerances which are introduced into the allowance.

The information and signal transmission is shown in FIG. 2 within the framework of a sensor bus, with consideration of tolerances occurring in this context. Possible causes and influences with respect to these tolerances are explained in greater detail later. The situation in FIG. 2 is explained by way of example in terms of a cylinder-selective lambda control within the framework of a sensor bus in the exhaust branch. For a cylinder-selective lambda control, the lambda measured values should be allocated to the specific segment S1, S2 and S3, respectively; that is to say, the start and end point of the measuring window is defined by synchronization points t1, t2 and t4.

The following variants are possible illustratively for ascertaining the lamda values:

Two lamda values are measured per segment, these values being transmitted without further evaluation to the control unit, particularly the engine control unit. On the other hand, the lambda values can be determined in a fixed time grid, e.g. a millisecond. When using intelligent or "smart" sensor technology, thus, sensor suites which contain a processing unit, preprocessing or preliminary evaluation, e.g. averaging, can be carried out locally in the sensor.

These preprocessed lamda values, e.g. average values, are then transmitted, particularly within the framework of a physical interface, via the bus system to the control unit. The physical interface has the advantage that sensors, particularly within the context of the line-less transmission yet to be presented later, can easily be added, taken from the interconnection or exchanged. In turn, variants are conceivable in processing the lamda values or average values, for example, averaging the measured lamda values within the first segment half of the respective segment, and/or averaging the measured lamda values within the second segment half. These two average values, separately for the first and second segment half, can then be transmitted to the control unit.

If the synchronization points are transmitted as software trigger signal STS via the bus system, e.g. a CAN bus, then a jitter, i.e. a tolerance Δt of the synchronization point, is taken into account.

Measured and/or pre-evaluated sensor information S1 can be transmitted, for example, in the following segment, here in S2. A return transmission is likewise still possible in the instantaneous segment, thus the cylinder-allocated segment, in which the measured values or sensor information are picked up, after the last measured values is picked up. At synchronization point t1, a software trigger signal STS is transmitted from the control unit, i.e. engine control unit SG, to the sensor; the start for the measurement by the sensor with respect to segment S1 takes place within tolerance Δt, thus within window TJ1. At synchronization point t2, a software trigger signal STS is again transmitted from the control unit to the sensor. The end of the measurement for segment 1, S1, as well as the start for the measurement for segment S2 lies in tolerance window TJ2 of the duration Δt. The return transmission, particularly of the pre-evaluated measured values of segment S1, sensor information SI1, takes place at point of time t3 with a transmission duration of Δtr, thus within window Ttr. At synchronization point t4, a software trigger signal STS is once more transmitted to the sensor. The end of the measurement for segment S2 as well as the start of the measurement for segment S3 then lies within jitter or tolerance window TJ3 of the duration Δt.

Possible causes or influences with respect to the jitter, thus tolerances TJ1, TJ2 and TJ3 of software trigger STS are compiled in the following. First of all, trigger signal STS is routed from the processing unit (e.g. the CPU) of the control unit to the connection unit (particularly a CAN controller). This transmission time of the STS as demand from the processing unit of the control unit to the connection unit of the control unit can vary sharply, and should advantageously be assumed later within the framework of a maximum transmission time.

Before the synchro information, thus software trigger signal STS can be transmitted via the bus system, particularly CAN, it may still be desirable to wait for the transmission duration of a message already being transmitted via the bus. Thus, it is desirable to wait for a transmission time of a bus message already to be transmitted, possibly even of a lower priority. This also is taken into consideration later. Furthermore, the transmission time of software trigger message STS itself via the bus system is taken into account. After software trigger signal STS, particularly as a CAN message, has arrived at the connection unit, particularly the CAN controller or CAN module of the sensor, a tolerance-encumbered time is still provided until synchronization information STS is available to a possible processing unit in the sensor. Consequently, a transmission time from the connection unit of the sensor to the processing unit of the sensor is be included in the calculation. These influences and fluctuations cause a certain jitter, thus the fluctuation of the significant points of time of the transmitted digital signal about an ideal, mostly equidistant point of time, thus a point of time always recurring at the same time.

In the return transmission as of t3, the transmission time of the sensor information from the sensor to the control unit is then taken into account. The processing time until the processing unit in the sensor has finished processing the sensor information, especially within the framework of an intelligent or smart sensor, can then be taken into consideration either prior to t3 or even still within window Ttr.

Figure 3:
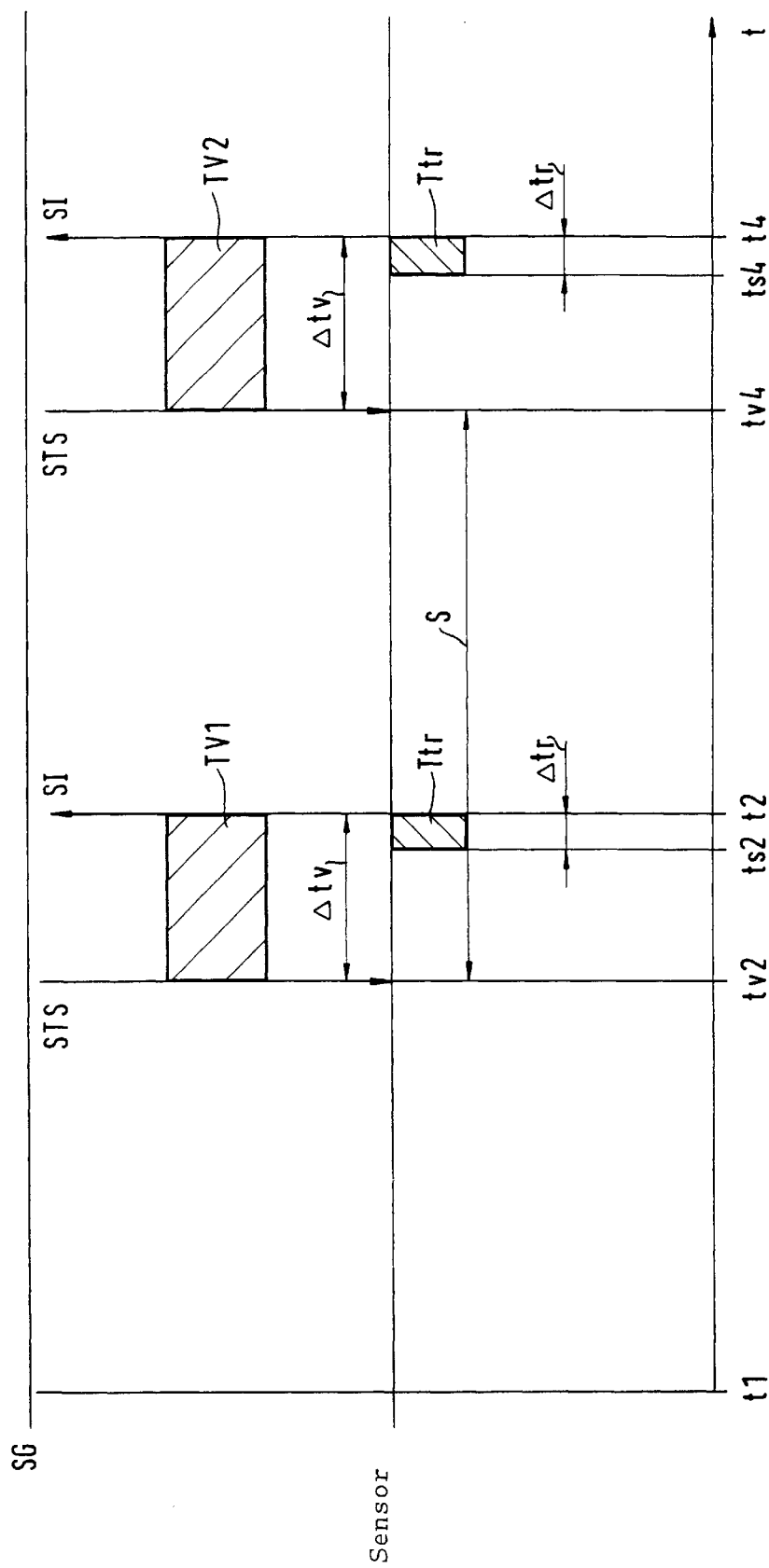
FIG. 3 shows the exchange of the trigger signal and sensor information with the allowance according to the present invention, using a hot-film air-mass meter (HFM) as an example.

According to the present invention, an allowance, particularly a time allowance or an angle allowance, is now provided in order to already have the sensor information available for the control unit at synchronization point t1, t2 and t3 in a manner that it is able to be read in and processed. To that end, in FIG. 3, using a hot-film air-mass meter HFM as an example, a time allowance Δtv is provided which, in addition to the tolerances indicated in FIG. 2, takes into consideration further transmissions or transmission times in order to already have the load signal available at the synchronization point.

These transmissions are, first, the request for the sensor transmission, transmitted software-wise from the control unit to the sensor, for example, via CAN, the ending of the preliminary evaluation or pre-processing in the sensor, e.g. the averaging of the measured values from the last segment, as well as the return transmission of the pre-evaluated sensor signals to the control unit, particularly the engine control unit.

These transmission times and processing times, respectively, are strongly tolerance-encumbered. In view of these allowance time windows tv1 and tv2 of the duration Δtv, the start and end points of the segment, here S, quasi shift in comparison to S2 to the earlier allowance points of time tv2 and tv4. This segment, shown by way of example, for the HFM thus lies between tv2 and tv4, that is to say, software trigger signals STS are transmitted at these points of time (tv2, tv4) from the control unit, particularly engine control unit SG, to the sensor, particularly hot-film air-mass meter HFM. Specifiable time allowance Δtv is then provided in such a way that the return transmission of the sensor information can take place within time windows tv1 and tv2, respectively, particularly the preprocessed sensor information with the transmission time window Ttr of the duration Δtr. Consequently, the most up-to-date sensor information is present at the control unit at actual synchronization point t2 and t4 in a manner that it is able to be read in and processed, so that the calculations only have to be carried out in a synchronized manner one time, and thus it is already possible to save on computing power at this point.

In one advantageous development, the dynamic influence of certain performance quantities, particularly the engine speed, thus the dynamics of the engine, is taken into account for the selection of the allowance, particularly as angle allowance or time allowance (tv1, tv2). For example, this is the case when the engine speed increases with maximum load or when the engine speed decreases sharply.

In this context, points of time tv1 and tv2 are to be depicted, for example, on the angle plane, which will be clarified later.

Therefore, the dynamic influence on the segment time for a positive engine-speed gradient is to be taken into account to the effect that, particularly in the case of low engine speeds, a noticeable reduction of the original segment time—thus, the segment time without dynamic influence in contrast to the segment time as a result of speed dynamics—can be determined. In order to counteract this decrease of the effective allowance in the case of high positive speed dynamics and given low engine speeds, corresponding to FIG. 4, the allowance is changed according to the present invention as a function of the dynamic performance quantity, particularly the engine speed. This allowance, particularly the allowance time, can likewise be changed upon exceeding an engine-speed dynamic, e.g. a threshold value.

Figure 4:
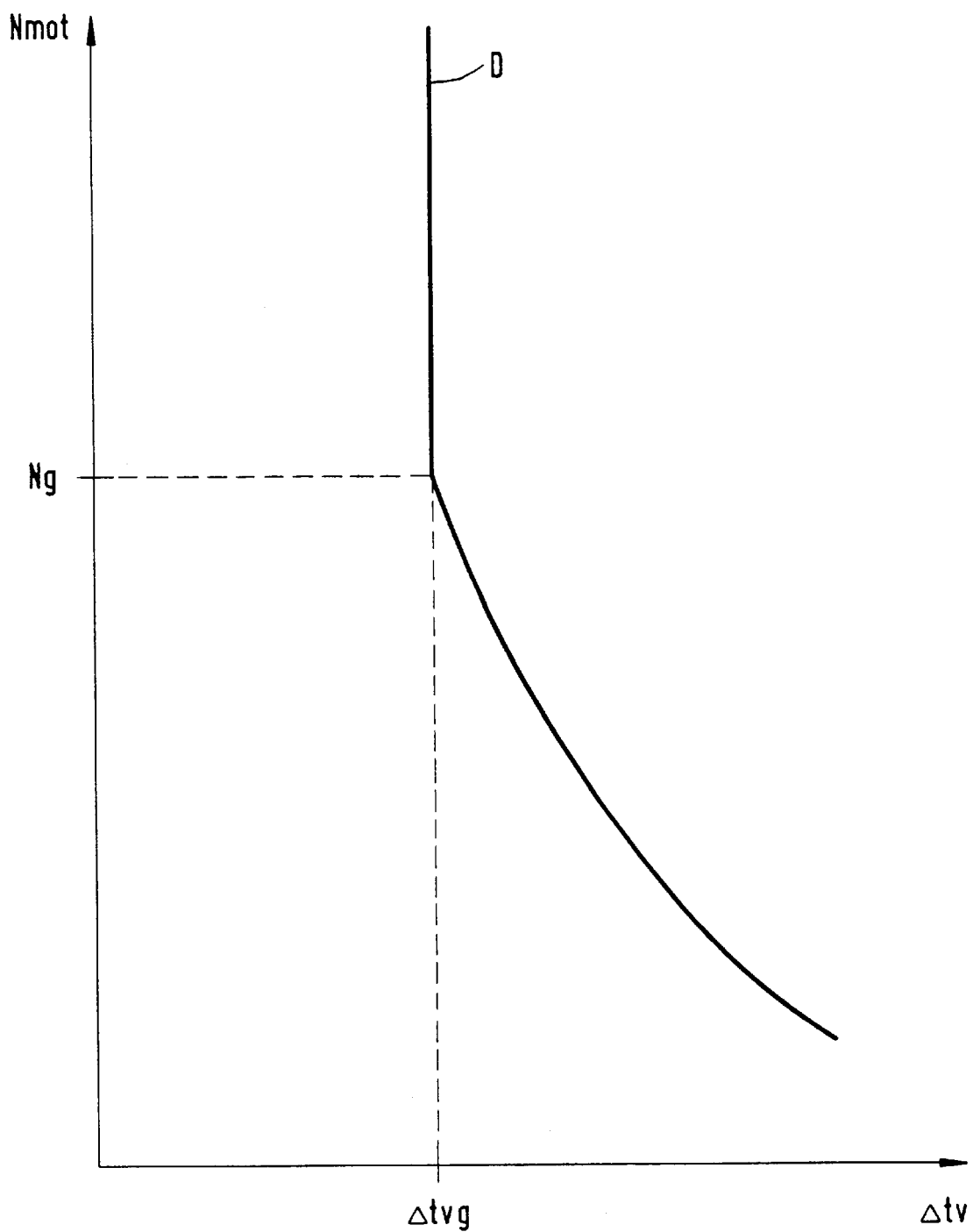
FIG. 4 shows the dynamic influence of the engine-speed performance quantity on the time allowance.

To that end, FIG. 4 shows engine speed Nmot over allowance time duration Δtv within the framework of a dynamics curve D. In this context, a limit time allowance Δtvg is taken into account. Within the framework of the previous tolerance considerations, allowance durations which are less than Δtvg may no longer ensure the topicality of the sensor information at the respective synchronization point.

This limit time allowance corresponds to a limit speed Ng. At speeds greater than limit speed Ng, the time allowance is held constant at Δtvg for the aforesaid reasons. At speeds less than limit speed Ng, the allowance, i.e. allowance time Δtv can be adjusted in order to counteract the decrease in the effective allowance time in the case of low engine speeds, thus small period time duration.

Figure 5:
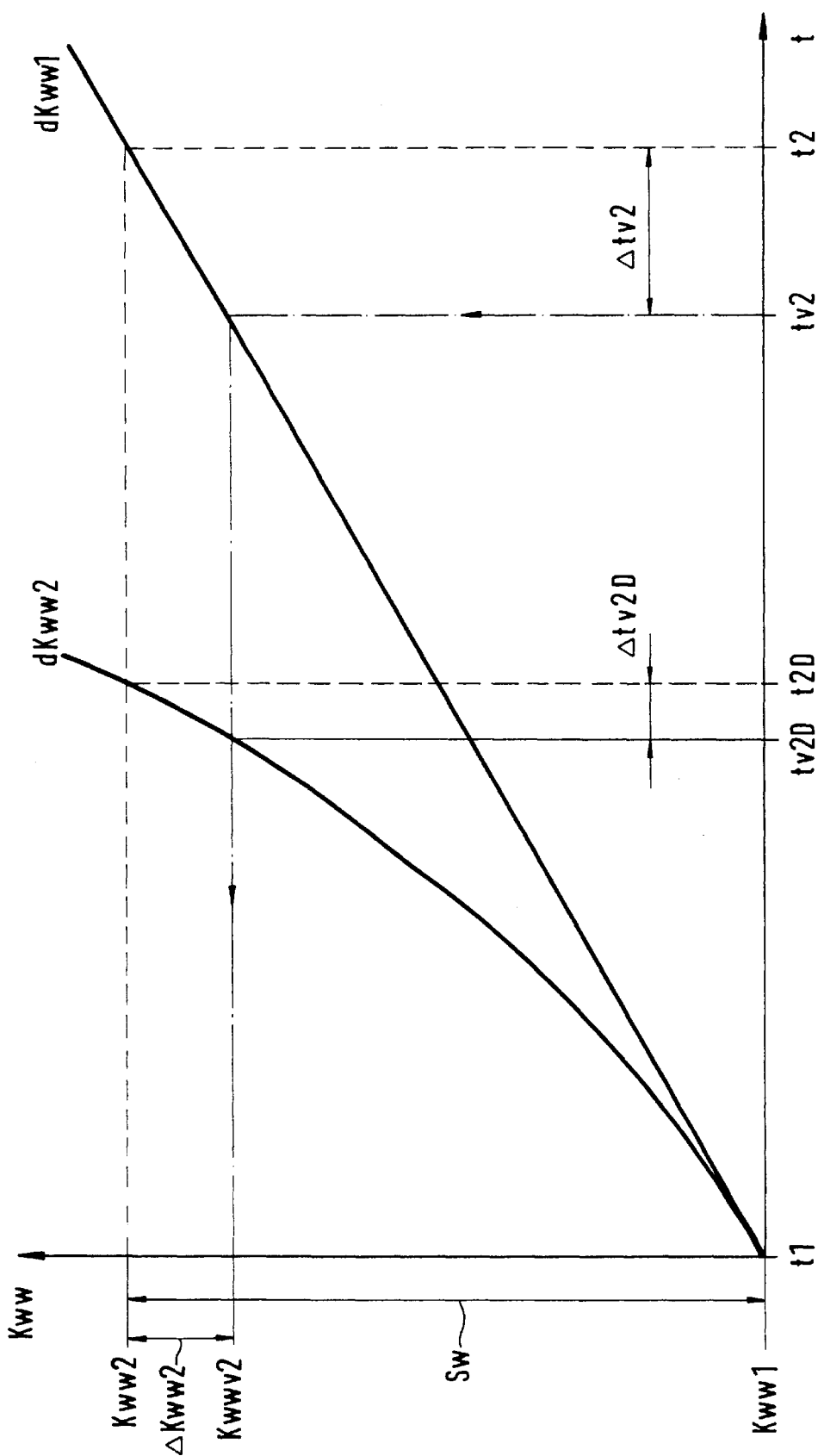
FIG. 5 shows the conversion between a time allowance and an angle allowance, taking into account the dynamic influences.

To take into account the dynamic influence and for imaging allowance points tv1 and tv2 on the angle plane, FIG. 5 shows a comparison of the crank angle profiles (Kww over t) for constant engine speeds dKww1 and for the acceleration of the engine dKww2. In view of the speed dynamics, synchronization point t2 shifts to dynamics point t2D to the left. In this context, it is taken into account that original point of time tv2 with allowance for the request for transmission of the sensor message, thus software trigger signal STS, lies to the right of t2D, therefore that given the presence of an engine-speed dynamics, the sensor message is first requested when present synchronization point t2D has already occurred.

If time allowance Δtv2 is converted at point of time t1 into an angle allowance ΔKww2, taking into account the angular velocity at t1, then upon reaching crankshaft angle Kwwv2, within the framework of the allowance, the transmission request can be started at point of time tv2D, thus the allowance point of time, taking into consideration the dynamics. In this way, the request for transmission of the sensor message, thus the transmission of software trigger signal STS, always takes place chronologically prior to reaching the synchronization point. In this case, therefore, by the time duration Δtv2D prior to synchronization point t2D. In FIG. 5, t1 corresponds to crankshaft angle Kww1. The segment observed in FIG. 5, transferred to the crankshaft angle, thus segment Sw, therefore reaches from Kww1 to Kww2.

The transfer to the angle, particularly the crankshaft angle, now yields the advantage that the performance quantity, here the engine speed, only has to be calculated at the synchronization point. The reason for this is that the instantaneous crankshaft angle is present in the engine control unit in any case, that is, upon reaching angle Kwwv2, the request for transmission of the sensor message, thus software trigger signal STS to the sensor, can be effected. Due to this restriction of the engine speed calculation to the synchronization points, considerable computing power and computing time can be saved in the engine control unit.

As a result of the speed dynamics, time allowance Δtv2 decreases to time allowance Δtv2D, thus the time allowance under dynamic influence. The transmission times according to the explanations for FIG. 2 and FIG. 3 likewise lie within the new allowance time Δtv2D. In FIG. 5, dKww1 represents the function for changing the crankshaft angle at constant engine speed, and dKww2 represents the function for changing the crankshaft angle in response to acceleration of the engine.

To ensure that software trigger signal STS is up to date, the software trigger signals possess a high priority, particularly the highest priority in the bus system. In this context, it is useful to provide the sensor signal to be transmitted, thus the sensor information, with a high priority, as well.

In one advantageous refinement of the present invention, a line-less connection is provided between sensors and the control unit, particularly within the context of a radio-bus system. Therefore, within the scope of the present invention, using bus systems, a transmission of a bidirectional type is provided between at least two users which follows fixed rules, thus, a bus protocol. To be understood by bus system according to the present invention is the line-conducted, as well as the line-less transmission. For example, a line-less bus transmission can be advantageous at a region which is inconvenient for line installation, such as in the exhaust branch. Therefore, additional line links, e.g. a line-encumbered bus system as well, are omitted, which means weight and costs can additionally be saved. In addition, this also permits an even more flexible retrofitting of the sensors compared to a physical interface of a line-conducted bus system.

FIG. 6, composed of FIGS. 6a and 6b, shows illustratively two selected possibilities for the sensor/control unit coupling, as here a line-less bus system, e.g. as a radio bus. In FIG. 6a, sensors 1 through n, thus 102 through 105, e.g. a lambda sensor suite, an HFM or NOX sensor, are connected to a central evaluation electronics 602 via connection units 607 through 610 on the sensor side and connection units 603 through 606 on the evaluation-electronics side. A transmit/receive module 601 is allocated to this evaluation electronics 602. Such a transmit/receive module 600 is likewise installed at the control unit, particularly in engine control unit 100. Consequently, a line-less data transmission is possible between central electronics, thus evaluation electronics 602 on the sensor side and control unit 100.

In this example, sensors 102 through 105 are connected to the evaluation electronics in a conventional manner, e.g. via a group of lines having four lines. As presented before, a bus system can instead couple the sensors here to the evaluation electronics and the transmit/receive part in a line-conducted or line-less manner, as well. The line-less data transmission can be a radio transmission, an optical transmission or any other line-less data transmission of any wavelength or frequency. Transmit/receive module 600 on the control-unit side can be mounted directly on or accommodated in the control unit. However, a line link between the control unit and transmit/receive module 600 is equally conceivable. The sensor signals measured in sensors 1 through n, 102 through 105, are preprocessed and evaluated at central evaluation electronics 602 shown here. Within the scope of the present invention, the central electronics can be used, for example, for evaluating the sensors of the exhaust branch.

In FIG. 6b, all sensors 1 through n, thus 102 through 105, are provided locally with a separate evaluation electronics 602a, 602b, 602c and 602d, respectively, including a transmit/receive module 601a, 601b, 601c and 601d. The evaluation electronics and the transmitter/receiver locally offer the advantages of a sensor adjustment, e.g. at the upper band limit, and a diagnosis locally. In this context, the transmitters can be differentiated, possibly on the basis of different frequencies or otherwise, in order to avoid collisions in the transmit and receive operation of the individual sensors and of the control unit, respectively. An appropriate bus protocol can achieve the same. The arrangements for the line-less data transmission described then fall back on the previously presented synchronization mechanism.

What is claimed is:

1. A method for controlling an operational sequence, comprising the steps of:

connecting at least one sensor that includes a connection unit via a bus system to at least one control unit for controlling the operational sequence, the at least one control unit including a connection unit;

transmitting sensor information to the at least one control unit;

causing the at least one control unit to at least one of read in and process the sensor information at a specifiable synchronization point; and causing the at least one control unit to transmit a trigger signal via the bus system to the at least one sensor in such a way that with an allowance, the sensor information is available at the specifiable synchronization point for the at least one control unit in a manner that the sensor information is able to be at least one of read in and processed.

2. The method according to claim 1, wherein:

the operational sequence is in a vehicle.

3. The method according to claim 1, further comprising the steps of:

causing the at least one sensor to preprocess the sensor information; and adapting the allowance according to a time for preprocessing the sensor information.

4. The method according to claim 1, further comprising the step of:

at least one of predefining and adapting the allowance in a variable manner, as a function of a performance quantity stemming from the operational sequence.

5. The method according to claim 4, wherein:

the step of at least one of predefining and adapting the allowance in the variable manner is performed as a function of an engine speed.

6. The method according to claim 1, further comprising the step of:

at least one of predefining and adapting the allowance as a function of at least one of the following influences:

a transmission time from a processing unit of the at least one control unit to the connection unit thereof, a transmission time of a bus message to be transmitted, a transmission time of the trigger signal via the bus system, a transmission time from the connection unit of the at least one sensor to a processing unit thereof, a processing time until the processing unit in the at least one sensor has finished processing the sensor information, and a transmission time of the sensor information from the at least one sensor to the at least one control unit.

7. The method according to claim 1, wherein at least one of:

the allowance is one of determined in the form of a time quantity as a time allowance and determined in the form of an angle quantity as an angle allowance, and the time allowance and the angle allowance are converted into one another.

8. The method according to claim 7, wherein:

when using the angle allowance, a performance quantity is only determined in the specifiable synchronization point.

9. The method according to claim 1, further comprising the step of:

providing various priorities for the bus system, the trigger signal having a highest one of the various priorities.

10. The method according to claim 1, further comprising the step of:

transmitting the sensor information and the trigger signal in a line-less manner between the connection unit of the at least one sensor and the connection unit of the at least one control unit, the connection unit of the at least one sensor and the connection unit of the at least one control unit each including a transmitter/receiver unit.

11. The method according to claim 1, wherein the allowance is a time allowance.

12. The method according to claim 1, wherein the allowance is an angle allowance.

13. The method according to claim 1, wherein the allowance is determined such that the sensor information is available just in time at the synchronization point for the control unit.

14. A device for controlling an operational sequence, comprising:

at least one sensor including a connection unit;

at least one control unit for controlling the operational sequence;

a bus system through which the at least one sensor is connected via the connection unit to a connection unit of the at least one control unit; and a first arrangement for transmitting sensor information to the at least one control unit, the at least one control unit at least one of reading in and processing the sensor information at a specifiable synchronization point, wherein:

the at least one control unit includes a second arrangement for transmitting a trigger signal via the bus system to the at least one sensor in such a way that with an allowance, the sensor information is available in a manner that the sensor information is able to be at least one of read in and processed at the specifiable synchronization point for the at least one control unit.

15. The device according to claim 14, wherein:
the operational sequence is in a vehicle.

16. The device according to claim 14, wherein:
each one of the connection unit of the at least one sensor and the connection unit of the at least one control unit includes a transmitter/receiver unit, and
the trigger signal and the sensor information are transmitted in a line-less manner.

17. The device according to claim 16, further comprising:
a radio bus system via which the trigger signal and the sensor information are transmitted in a line-less manner.

18. The device according to claim 14, wherein:
the device is used within a framework of an exhaust branch of a vehicle, the at least one sensor including one of a lamda sensor and a hot-film air-mass meter, and the at least one control unit being including an engine control unit.

19. A method for controlling an operational sequence, comprising the steps of:
connecting at least one sensor that includes a connection unit via a bus system to at least one control unit for controlling the operational sequence, the at least one control unit including a connection unit;
transmitting sensor information to the at least one control unit;
causing the at least one control unit to at least one of read in and process the sensor information at a specifiable synchronization point;
causing the at least one control unit to transmit a trigger signal via the bus system to the at least one sensor in such a way with an allowance that the sensor information is available at the specifiable synchronization point for the at least one control unit in a manner that the sensor information is able to be at least one of read in and processed; and
at least one of predefining and adapting the allowance as a function of at least one of the following influences:
a transmission time from a processing unit of the at least one control unit to the connection unit thereof,
a transmission time of a bus message to be transmitted,
a transmission time of the trigger signal via the bus system,
a transmission time from the connection unit of the at least one sensor to a processing unit thereof,
a processing time until the processing unit in the at least one sensor has finished processing the sensor information, and
a transmission time of the sensor information from the at least one sensor to the at least one control unit.

20. A device for controlling an operational sequence, comprising:
at least one sensor including a connection unit;
at least one control unit for controlling the operational sequence;
a bus system through which the at least one sensor is connected via the connection unit to a connection unit of the at least one control unit; and
a first arrangement for transmitting sensor information to the at least one control unit, the at least one control unit at least one of reading in and processing the sensor information at a specifiable synchronization point, wherein:
the at least one control unit includes a second arrangement for transmitting a trigger signal via the bus system to the at least one sensor in such a way with an allowance that the sensor information is available in a manner that the sensor information is able to be at least one of read in and processed at the specifiable synchronization point for the at least one control unit, the allowance being at least one of predefined and adapted as a function of at least one of the following influences:
a transmission time from a processing unit of the at least one control unit to the connection unit thereof,
a transmission time of a bus message to be transmitted,
a transmission time of the trigger signal via the bus system,
a transmission time from the connection unit of the at least one sensor to a processing unit thereof,
a processing time until the processing unit in the at least one sensor has finished processing the sensor information, and
a transmission time of the sensor information from the at least one sensor to the at least one control unit.

* * * * *